July 7, 1959  S. O. SHUMAKER  2,893,667
FISHING ROD HOLDER
Filed Jan. 6, 1954  3 Sheets-Sheet 1
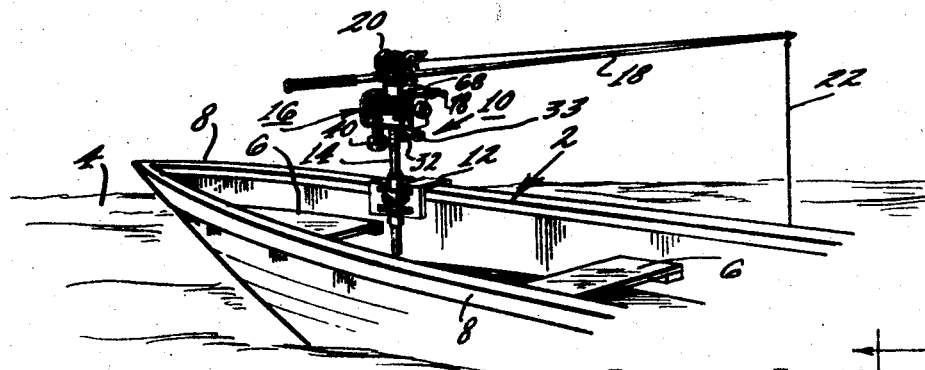
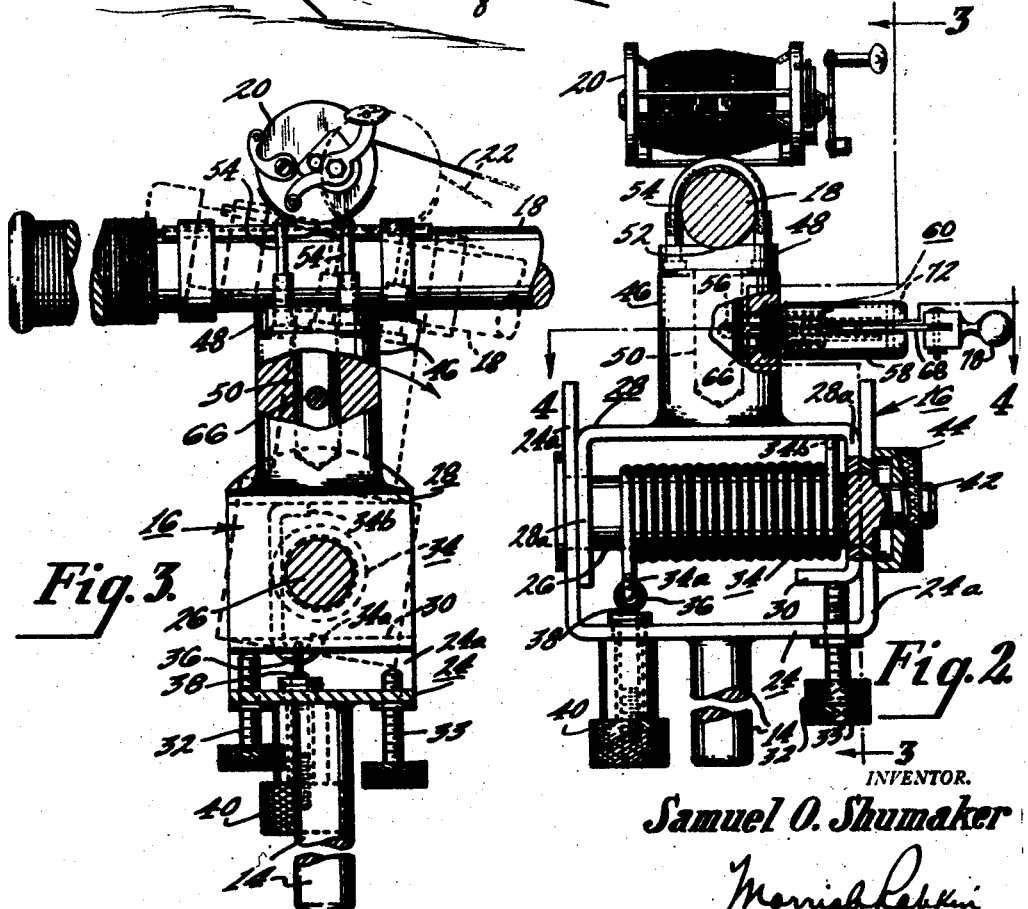
INVENTOR.
Samuel O. Shumaker
BY
ATTORNEY

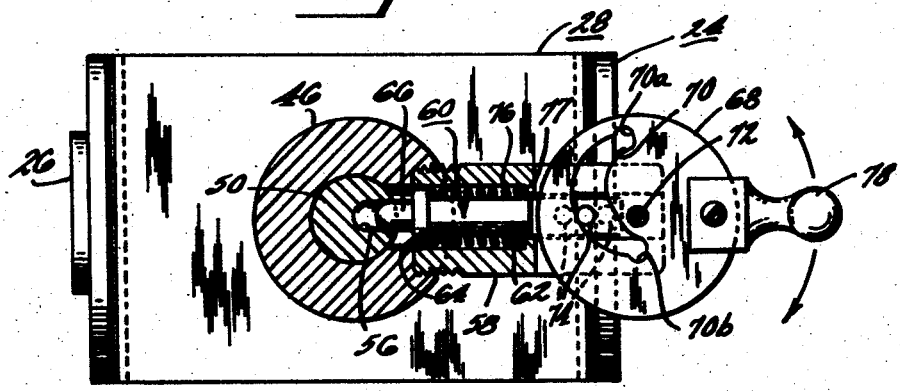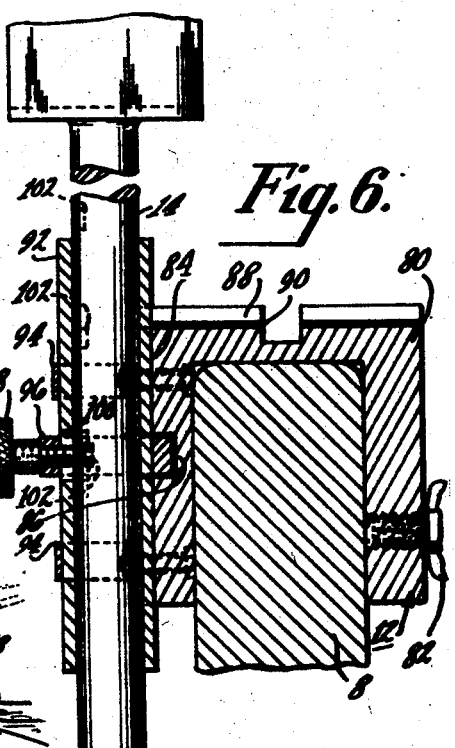

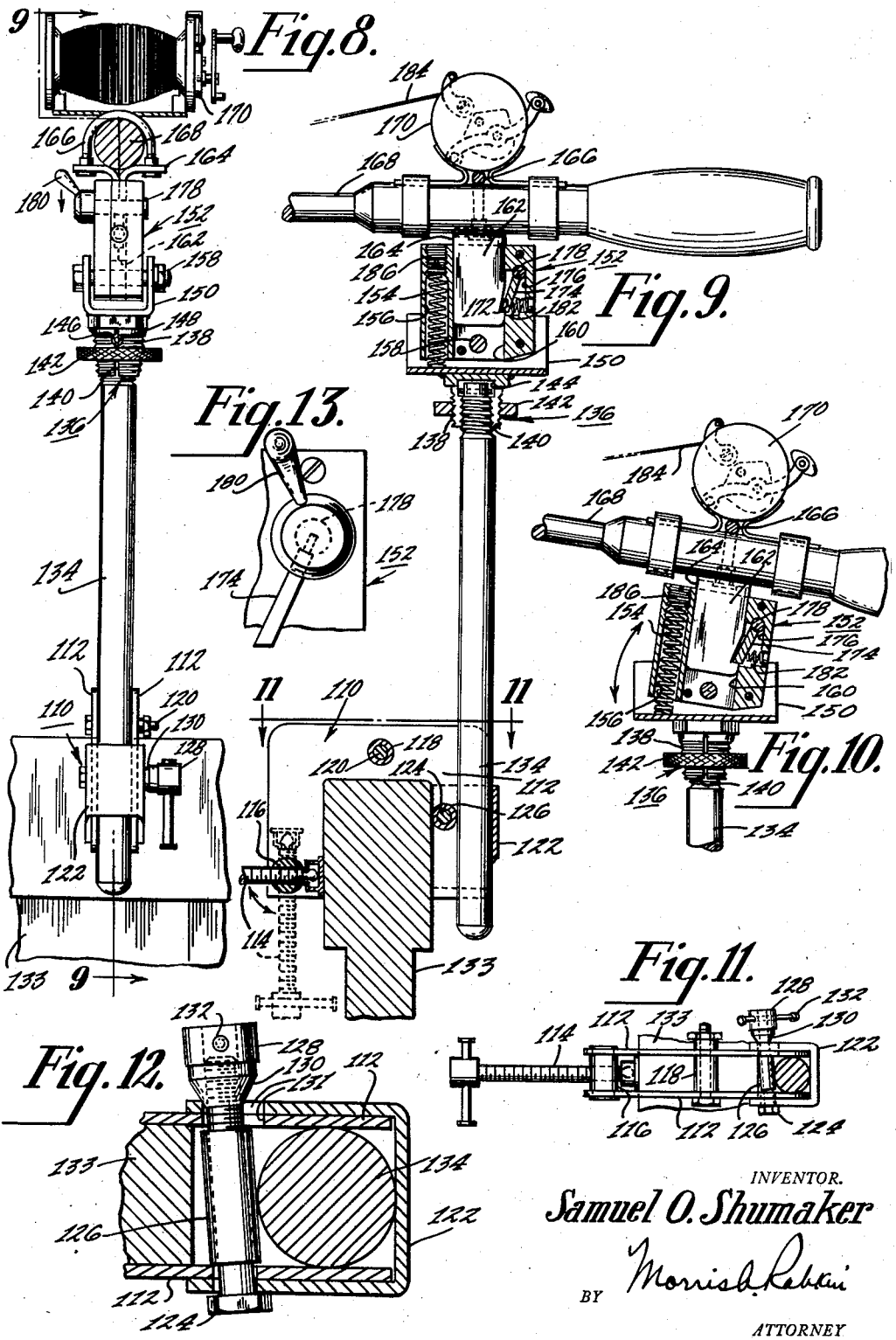

# United States Patent Office 2,893,667
Patented July 7, 1959

2,893,667

FISHING ROD HOLDER

Samuel O. Shumaker, Merchantville, N.J.

Application January 6, 1954, Serial No. 402,522

12 Claims. (Cl. 248—40)

This invention relates to fishing rod holders, and more particularly to means for holding a fishing rod while trolling.

When a sport fisherman is trolling from a light craft such, for example, as a row boat or a small power boat, it sometimes becomes necessary or desirable for the fisherman to have both hands available for other duties such as the operation of the craft. During such time, it is also desirable to continue to troll. It therefore becomes necessary to have some suitable means for holding the rod in an appropriate position.

Various forms of rod holders have been designed heretofore in attempts to meet the above described need. So far as I am aware, all such rod holders are subject to certain shortcomings which render them impractical. Many of these rod holders are much too bulky and complicated to be useful, particularly in light craft. Many of them also fail to provide means for allowing the rod to point in the direction of the fish once a fish is hooked. Also, most of them fail to allow the rod to point downward toward the water to prevent excessive strain from being exerted on the pole.

Accordingly, it is an object of my present invention to provide an improved fishing rod holder which obviates the foregoing and other similar difficulties found in prior art rod holders.

Another object of my invention is to provide an improved fishing rod holder as set forth wherein the holder assembly is simple in construction and operation.

A further object of my invention is to provide an improved fishing rod holder as set forth wherein the assembly may be readily detachably secured to any of several members of a craft, such as the transom, the seat or the gunwales.

Still another object of my invention is to provide an improved fishing rod holder as set forth which will hold the rod firmly in place while one is trolling but which will permit the rod to swing and/or dip readily in response to added forces applied as a result of a fish being hooked.

A further object of my invention is to provide an improved fishing rod holder of the type set forth which will hold the rod securely against being pulled overboard but from which the rod can be removed easily, quickly and conveniently for the purpose of playing a hooked fish.

Yet another object of my invention is to provide an improved fishing rod holder of the type set forth which obviates the heretofore customary tube-type socket for receiving the butt end of the fishing rod, as well as the difficulties normally incident to the use of such socket type holders.

In accomplishing these and other objects and advantages, I have provided, in accordance with my present invention, a U-shaped clamp member which is adapted to be rigidly clamped at will to either a horizontal or a vertical member on a craft. In either position, the clamp is adapted to hold a shaft in a substantially vertical position. On the end of the shaft opposite the clamp there is provided a rod holder bracket assembly. The bracket assembly includes (1) head means for allowing a limited amount of vertical movement of the rod against an adjustable spring bias, (2) a rod holding clamp member, and (3) a positively acting, quickly detachable means for attaching the rod holding clamp to the head means. I have also provided means permitting a limited horizontal rotation of the bracket assembly against a frictional bias.

A better understanding of this invention may be had from the following detailed description when read in connection with the accompanying drawings in which:

Fig. 1 is a fragmentary pictorial view of a light craft showing a fishing rod holder embodying the present invention in place on the gunwale of the craft;

Fig. 2 is an enlarged elevational view, partly in cross-section, of the rod holder bracket assembly forming part of the rod holder shown in Fig. 1;

Fig. 3 is a view taken along the line 3—3 of Fig. 2 and looking in the direction of the appended arrows;

Fig. 4 is an enlarged sectional view taken along the line 4—4 of Fig. 2 and looking in the direction of the appended arrows;

Fig. 5 is a top view, partly in cross-section, of the mounting clamp of a rod holder of the type shown in Fig. 1;

Fig. 6 is a sectional view taken along the line 6—6 of Fig. 5 and looking in the direction of the appended arrows;

Fig. 7 is a view similar to that of Fig. 1 but showing the holder clamped to the seat of a craft;

Fig. 8 is a view, partly in cross-section, of another type of rod holder according to my present invention;

Fig. 9 is a sectional view taken along the line 9—9 of Fig. 8 and looking in the direction of the appended arrows, this view showing the rod holder bracket assembly in the position it occupies when it is strained by a hooked fish;

Fig. 10 is a fragmentary view similar to Fig. 9 but showing the rod holder bracket assembly in the normally idle or trolling position;

Fig. 11 is a sectional view taken along the line 11—11 of Fig. 9 and looking in the direction of the appended arrows;

Fig. 12 is an enlarged, fragmentary view, partly in section, showing details of one type of mounting clamp in accordance with my invention; and Fig. 13 is an enlarged view showing details of the rod holding clamp latch of the bracket assembly of Fig. 9.

Referring, now, to the drawings in more detail, there is shown, in Fig. 1, a boat 2 floating on the water 4. The boat has seats 6 and gunwales 8. Shown in position on the starboard gunwale 8 is a fishing rod holder 10. The holder 10 includes a substantially U-shaped mounting clamp 12 which supports a shaft member 14 vertically. To the upper end of the shaft 14 is secured a rod holder bracket assembly 16. Positively held by the bracket assembly 16 is a fishing rod 18 with its associated reel 20 and line 22.

In Figs. 2 and 3, the rod holder bracket assembly or structure 16 is more clearly shown. The upper end of the shaft 14 is secured, as by welding, to the center of a U-shaped bracket base member 24. Each of the upstanding legs 24a of the bracket base member 24 is provided with a suitable circular hole through both of which passes a bracket pivot 26. A second and inverted U-shaped member or pivot plate 28 is fitted between the legs of the bracket base 24. The legs 28a of the pivot plate 28 are also provided with suitable holes through which the bracket pivot 26 also passes, holding the two members 24 and 28 together. One of the legs 28a of pivot plate 28 is provided with a turned-in foot 30 constituting a stop. A pair of adjustable stop screws 32 and 33 are threaded through the bottom of the bracket base member 24 into cooperative relation with the turned-in foot or stop 30 of the pivot plate 28 for adjustably limiting the amount of pivotal freedom of the pivot plate 28 with respect to the bracket base 24. A torsion spring 34 is wound about the bracket pivot 26. One end 34a of the spring 34 is formed with a hook and is adjustably anchored to the bracket base 24 through an anchor eye 36 on one end of a threaded rod 38. The rod 38 may be raised or lowered by means of an adjusting nut 40 to correspondingly increase or decrease the spring bias. The other end 34b of the spring 34 is made to bear against the under side of the pivot plate 28, as best seen in Figs. 2 and 3, to cause the pivot plate 28 to tend to rotate counter-clockwise (as viewed in Fig. 3) about the pivot 26 into engagement with the right hand stop screw 33. A threaded extension 42 on the end of the bracket pivot 26 carries a knurled nut 44 thereon. By turning up the nut 44 on the extension 42, more or less frictional bias may be provided between the bracket base 24 and the pivot plate 28 to thereby more or less resist relative movement between the bracket base 24 and the pivot plate 28.

Secured, as by welding, to the center of the pivot plate 28 is an upstanding socket 46. This socket 46 is provided with an axial opening or bore which is open from the top to receive a rod holding clamp. This clamp includes a clamp plate 48 which is secured to and may be integral with a depending stud 50. The upper surface of the clamp plate 48 is provided with a rod aligning groove 52. The rod holding clamp is securely fastened to the rod 18 at a position susbtantially opposite the reel 20 by one or more U-bolts 54, the rod being held in properly aligned position by the coaction of the groove 52 and the transverse curvature of the rod. The depending stud 50 is receivable freely but without excessive play in the axial bore of the socket 46. One side of the depending stud 50 is bored transversely to provide a retainer notch 56. A rod holding clamp retainer assembly, which is shown on an enlarged scale in Fig. 4, is associated with the socket 46 in a position to engage the retainer notch 56 in the stud 50.

The retainer assembly includes an outer housing member 58 which is threaded into a complementary opening in the side of the socket 46. The housing member 58 has a central bore into which is slidingly fitted a plunger 60 having a main body portion 62, a collar 64 and a retaining pin 66. The end of the plunger opposite from the retaining pin 66 is bifurcated, as is the housing 58. A cam disc 68 having a cam slot 70 is positioned between the legs of the bifurcated end of the plunger 60 and the housing 58. The cam disc 68 is pivotally secured to the housing member 58 by a pivot pin 72. A cam follower pin 74 on the plunger 60 links the plunger 60 to the cam disk 68, passing through the legs of the bifurcated end of the plunger 60 and through the cam slot 70. A compression spring 76 is positioned between the collar 64 of the plunger 60 and a shoulder 77 in the bore of the housing 58, maintaining the cam follower pin 74 in cam following contact with the edge of the cam slot 70.

It will be noted that dwells 70a and 70b are provided at the ends of the cam slot 70. An operating handle 78 is attached to the cam disk 68. The cam disk 68 is shown, in Fig. 4, in a position where it engages the follower pin 74 midway between the two dwells in the cam slot 70 with the retaining pin 66 partly in the notch 56. If the operating handle 78 were now to be pushed to its extreme counter-clockwise position, in the illustrated example shown in Fig. 4, the compression spring 76 would urge the plunger to the left. This would cause the retaining pin 66 to enter the notch 56 of the stud 50, thereby preventing the removal of the rod holder clamp from socket 46. In this position of the cam plate, the pin 74 is received in the dwell 70a to securely hold the cam plate against accidental clockwise rotation. If, however, the handle 78 were now to be forcibly moved to its extreme clockwise position, the retainer pin 66 would be withdrawn from the notch 56, thus freeing the clamp, and hence the rod, for ready removal from the bracket 16. In its extreme clockwise position, the cam plate is held in place by cooperation of the pin 74 and the dwell 70b.

In Figs. 5 and 6, there is shown, in detail, the structure of one form of mounting clamp 12 which includes a substantially U-shaped clamp member 80 and a pair of wing clamping screws 82 threaded through one leg of the clamp 80 for attaching the clamp to a part of a boat, such as a gunwale 8. A first guide groove 84 is provided along one leg of the clamp member 80, running in the direction from the closed end of the U-shaped member to the open end, and coextensive with the leg. Between the ends of this groove, there is provided a recess 86 of greater width and depth than the guide groove 84 but only a fraction of the length of the guide groove. A second guide groove 88 is provided which extends transversely along the closed end of the clamp 80, and a recess 90, similar to the recess 86, is provided in the groove 88.

A sleeve member 92 is adapted to be positioned in either of the guide grooves 84 or 88 and held rigidly in place by a pair of strap members 94. In Figs. 5 and 6, where the clamp member 80 is shown secured to the gunwale 8, the sleeve 92 is shown in position in the first groove 84, while in Fig. 7, where the clamp member 80 is shown attached to the seat 6 of the boat 2, the sleeve 92 is shown positioned in the second groove 88. Encircling the sleeve 92 is a loose fitting collar 96. This collar 96 is received in the recesses 86 or 90 which also serve to prevent any appreciable amount of longitudinal motion of the collar 96 with respect to the sleeve 92. A thumb screw 98 is threaded through the collar 96 and also passes through a transverse slot 100 in the sleeve 92 (see Fig. 5).

The sleeve 92 has a central, axial bore in which the shaft 14 may be positioned. With the shaft 14 in position in sleeve 92, the thumb screw 98 may be tightened. The inner end of the thumb screw passes through the slot 100 and bears against the shaft 14, pressing the shaft against the opposite wall portion of the sleeve 92. The collar 96 is, of course, accordingly pressed against the outer wall portion of the sleeve. The shaft 14 is preferably provided with a number of recesses 102 spaced longitudinally of the shaft and adapted to receive the end of the thumb screw 98. When the end of the thumb screw engages one of these recesses 102, the shaft 14 is prevented, by coaction of the thumb screw 98, the collar 96, and either of the collar retaining recesses 86 or 90, from moving in a longitudinal direction.

It may be seen that, when the thumb screw 98 is tightened, the shaft 14 frictionally engages the sleeve 92. A greater tightening of the thumb screw, of course, increases the frictional engagement. Since the sleeve 92 is held rigidly, it is not free to rotate. However, the thumb screw extends through the slot 100 which allows the collar 96 to rotate a limited amount around the sleeve. This arrangement permits the shaft 14, which is held by the thumb screw 98, to rotate within the sleeve 92. The tightness of the thumb screw 98 determines the frictional engagement between the shaft 14 and the sleeve 92, and, hence, the amount of torque or force required to cause the assembly to turn with respect to the sleeve.

In operation, the mounting clamp 12 is secured to a part of the boat, as shown in either of Figs. 1 or 7, with the sleeve 92 and the collar 96 in place on the U-shaped clamp member 80. The shaft 14 is inserted in the sleeve 92 to a desired height and locked in place by the thumb screw 98. The rod holding clamp plate 48, together with its depending stud 50, is attached to the rod 18 in an appropriate position by means of the U-bolts 54. The line 22 is played out to a desired length. Then, the operating handle 78 of the retainer assembly is moved to a position to retract the retainer pin 66, allowing the stud 50 to be inserted into the socket 46. The operating handle 78 is then moved to the opposite end of its travel to allow the spring 76 to urge the retaining pin 66 into the retainer notch or hole 56. The rod 18 is thus securely connected to the holder in a substantially horizontal position. The angle at which the rod is held depends upon the setting of the stop screw 33. When a fish takes the hook on the end of the line 22, the outer end of the rod 18 will be pulled down toward the water against the tension of the spring 34, assuming, of course, that the fish is of sufficient size to exert enough force on the rod. The downward tilting of the pivot plate 28 and, therefore, of the rod may be limited by an adjustment of the stop screw 32. The latter limitation on the movement of the rod constitutes a safeguard against the rod's being broken by striking a part of the boat, for example.

When the fish has struck, the fisherman then takes hold of the rod, in the usual manner for playing the fish, with one hand. With the other hand, he quickly and easily throws the operating handle 78 of the retainer assembly to withdraw the retainer pin 66 from the hole 56 in the stud 50, thus permitting ready removal of the rod 18 from the bracket 16. The clamp plate 48 and the stud 50 remain attached to the rod. The clamp plate and stud may be made of aluminum, thus adding very little weight to that of the rod and reel. Further, with the plate 48 positioned diametrically opposite the reel 20 on the rod 18, it occupies a position where it in no way interferes with the manipulation of the rod or the reel.

In Figs. 8–13, there is shown a somewhat simpler structure which also embodies the present invention. A mounting clamp assembly 110 comprises a U-shaped clamp member 112 having a pair of spaced, parallel side elements, and a clamping screw 114 which may be carried in a swivel spacer 116. A sleeve 118 constitutes a second spacer and is held in place by a bolt and nut assembly 120. A detachable U-shaped backing member 122 is held in place by a bolt 124. Surrounding the bolt 124, as it extends between the two parallel members 112, is another spacer sleeve 126. To the end of the bolt 126 opposite its head is threaded a self-centering nut 128 having a tapered face 130 which cooperates with a pair of aligned holes 131 in the clamp member 112 and the backing member 122, and with a suitable tightening handle 132. The holes 131 in the parallel members 112 and the backing member 122 are somewhat larger than the diameter of the bolt 124 which passes through them, allowing an amount of play in the bolt. The shaft 134 of the rod holding device is inserted, at a desired height, between the sleeve 126 surrounding the bolt 124 and the backing member 122. Tightening of the nut 128 forces the tapered face 130 of the nut into the holes 131. As the tapered portion of the nut is drawn into these holes, the bolt 124 is caused to move toward a central position with respect to the holes 131. This movement of the bolt exerts a clamping force on the shaft 134, locking it between the sleeve 126 and the backing member 122. Although, for purposes of illustration, the backing member is shown attached to the leg of the clamp 112 which is opposite from the assembly clamping screw 114, it should be understood that the backing member 122 may be positioned along the closed end of the clamp 112, with the bolt 124 exchanging places with the screw 120. In this manner, the shaft 134 may be mounted substantially in a vertical position irrespective of whether the clamp 112 is mounted on a vertical or a horizontal portion of a boat 133.

The upper end of the shaft 134 is threaded into a variable friction socket 136. The socket 136 is internally threaded to receive the threaded end of the shaft 134. Externally, the socket is provided with a tapered thread 138. Additionally, the socket 136 is provided with a plurality of longitudinal slots 140. A knurled collar 142 is threaded onto the outside of the socket. When the threaded end of the shaft 134 is properly in position within the socket 136, the collar 142 may be tightened or loosened, as the case may be, causing the socket 136, by collet-type action, to increase or decrease its frictional grip on the threaded end of the shaft 134. This action increases or decreases, accordingly, the torque that must be applied to cause a rotational motion of the socket 136 with respect to the shaft, for reasons which will appear hereinafter. The extreme inner position of the socket is provided with a recess 144 (see Fig. 9) of a diameter greater than the diameter of the internally threaded portion of the socket. As will be noted in Fig. 8, one of the slots 140 has an enlarged opening 146 near its upper end. When the shaft 134 is inserted sufficiently into the socket 136, a pin 148 is passed through the enlarged opening 146 and pressed into a suitable hole in the end of the shaft. This pin 148 is of a length to permit it to rotate freely in the recess 144 but is too long to allow it to pass below the shoulder defined by the lower edge of the recess, thus preventing the shaft from being withdrawn from the socket by a torque tending to unscrew the socket from the shaft. A torque applied in the opposite direction would cause the socket to turn further down on the shaft until the end of the shaft is engaged by the end or top of the socket. In this manner, there is provided a limited amount of rotational freedom of the socket with respect to the shaft. The force necessary to effect this rotation must, however, be sufficient to overcome the aforementioned friction.

Secured to the upper end of the socket 136, as by welding, is a bracket base member 150 of a rod holder bracket assembly. The base member 150 comprises a U-shaped channel member. Pivotally mounted between the upstanding sides of the base member is a socket block 152. A compression spring 154 is mounted in a guide well 156 drilled into the block 152. The spring 154 presses on the base member 150, tending to bias the block 152 in a clockwise direction about its pivot bolt 158, as viewed in Fig. 9.

A central passage 160 through the block 152 constitutes a socket to receive a latchable tab 162 depending from a rod holding clamp 164. The rod holding clamp 164 may comprise a pair of small, flat plates, of a metal such as aluminum, which are bent to substantially an L-shape, and held together by any suitable means. When the two plates are secured together in back to back relationship, a longitudinal groove will be defined where the two bends of the plates meet. This groove constitutes an aligning groove for the fishing rod similar to the aligning groove 52 of the previously described embodiment of the invention. As before, one or more U-bolts 166 secure the rod 168 to the rod holding clamp 164 at a position substantially opposite from the position of the reel 170. Low on one side of the latchable tab 162, there is provided a latch notch 172. In a position to cooperatively engage the notch 172, a latch 174 is pivotally mounted in a latch recess 176 in the block 152 by means of a pivot shaft 178 to which it is secured. The pivot shaft 178 extends to a position externally of the block 152, where a latch operating handle 180 is attached thereto. A latch spring 182 is positioned, with respect to the latch 174, to urge the latch into engagement with the notch 172. A relatively light pressure on the operating handle 180 moves the latch 174 out of engagement with the notch 172, permitting the easy removal of the rod 168 and the rod clamp 164 from the rod holder bracket.

As in the previous example, in operation, the holder assembly is attached to a selected portion 133 of a boat. The line 184 is paid out and the rod holding clamp 164, which is attached to the rod, is inserted in the passage 160 of the socket block 152. The latch 174 automatically engages the notch 172, locking the members together.

Under the bias of the spring 154, the rod 168 is held in a substantially horizontal, or slightly tipped-up, position as shown in Fig. 10. When a fish of sufficient size is hooked, the rod is pulled forward, against the bias of the spring 154, to a horizontal or slightly tipped-down position, as shown in Fig. 9. A screw slug 186 is provided to render the spring bias variable. If, when the fish strikes, the rod is not aimed substantially in the general direction of the fish, the whole bracket assembly may be turned on the end of the shaft 134 if, as aforesaid, the applied pull is sufficient to overcome the friction exerted by the socket 136.

It will readily be seen that, while in either of the illustrative examples the rod is held normally in a substantially horizontal position, it is permitted, against spring bias, to tip toward the water under the pull of a sizeable fish. Moreover, the rod may, against friction bias, be rotated to follow the transverse motion of a hooked fish. Thus, the likelihood of the rod being damaged by excessive strain while in the rod holder is reduced to a negligible amount. It will also readily be seen that greatly improved results are obtained through the use of the herein described fishing rod holder, since the rod may be readily detached from the holder, while playing a fish, in contradistinction, for example, to struggling to free the butt end of the rod from a heretofore conventional butt socket.

I claim as my invention:

1. A fishing rod holder comprising, in combination, a shaft adapted to be disposed in a substantially vertical position, a rod holder bracket structure carried by the upper end of said shaft, a rod holding clamp plate, means carried by said bracket structure including a latching device for positively locking said clamp plate to said bracket structure against accidental displacement therefrom, and means associated with said latching device for unlocking said clamp plate from said bracket structure to free said clamp plate for quick separation thereof from said bracket structure.

2. A fishing rod holder comprising, in combination, a shaft adapted to be disposed in a substantially vertical position, a rod holder bracket structure mounted on the upper end of said shaft, a rod holding clamp plate having a depending latchable member, means for clamping a fishing rod to said clamp plate, a socket member carried by said rod holder bracket structure and receiving said depending latchable member, latch means carried by said socket member for cooperatively engaging said latchable member to positively lock said clamp plate to said bracket structure for holding said rod in a substantially horizontal position, and means associated with said latch means for releasing said latch means from said latchable member to thereby free said clamp plate for quick removal of said clamp plate and said rod from said bracket structure.

3. The invention set forth in claim 2 characterized in that said bracket structure includes a relatively stationary base member, said socket member being mounted on said bracket structure for pivotal movement relative to said base member, and characterized further by the inclusion of means on said base member cooperative with said socket member providing a limited pivotal motion of said socket member relative to said base member whereby to limit pivotal movement of said rod in a vertical plane.

4. The invention as set forth in claim 3 including means coupled to said shaft for providing a limited rotary motion of said rod in a horizontal plane, and means providing a friction bias tending to resist such rotary motion.

5. The invention set forth in claim 4 characterized by the addition of a mounting device for said shaft, and wherein said friction bias providing means comprises a variable friction coupling between said mounting device and said shaft.

6. A fishing rod holder comprising, in combination, a mounting device for mounting said holder on a suitable support, a shaft carried in a substantially vertical position by said mounting device, a rod holder bracket structure mounted on the upper end of said shaft, a rod holding clamp plate having a depending stud, said stud having a retainer notch therein, means on said clamp plate for clamping a fishing rod to said clamp plate, a socket member carried by said rod holder bracket structure and receiving said stud, latch means including a cam actuated plunger carried by said socket member and cam means operable selectively to move said plunger into and out of engagement with said retainer notch in said stud whereby to detachably lock said clamp plate to said bracket structure for holding said rod in a substantially horizontal position.

7. The invention as set forth in claim 6 wherein said bracket structure includes a base member rigidly secured to the end of said shaft, a pivot plate pivotally secured to said base member, said plate being pivotal in a vertical plane, stop means for limiting the pivotal freedom of said plate, and a torsion spring between said base member and said pivot plate arranged to resist the pivotal motion of said plate in one direction, said socket member being secured to said pivot plate.

8. The invention as set forth in claim 7 including means for adjusting the bias applied by said torsion spring.

9. A fishing rod holder comprising, in combination, a shaft adapted to be disposed in a substantially vertical position, a rod holder bracket structure mounted on the upper end of said shaft, a rod holding clamp plate having a depending latchable tab, said tab having a latch notch therein, a socket member carried by said bracket structure and receiving said tab, latch means including a pivoted latch carried by said socket member, spring means for biasing said latch into locking engagement with said latch notch in said tab to lock said clamp plate to said bracket structure for holding said rod in a substantially horizontal position, and manually operable means connected to said latch for disengaging said latch from said notch at will to free said clamp plate and said rod for quick detachment thereof from said bracket structure.

10. The invention as set forth in claim 9 wherein said bracket structure includes a base member, means swivelly securing said base member to the upper end of said shaft, said socket member comprising a socket block pivotally secured to said base member, said socket block being pivotal in a vertical plane, a compression spring mounted on said block and engaging said base member to resist the pivotal motion of said block in one direction.

11. The invention as set forth in claim 10 including means for adjusting the bias exerted by said compression spring.

12. The invention as set forth in claim 10 wherein said means swivelly securing said base member to said shaft includes a threaded portion on said shaft, an internally threaded shaft socket into which said threaded portion of said shaft fits, said shaft socket being provided with a plurality of longitudinal slits, said shaft socket being externally tapered and threaded, and an internally threaded clamping collar threaded onto said tapered threaded portion of said shaft socket, said collar being operable to effect, through collet action, a variable clamping friction between said shaft and said shaft socket.

References Cited in the file of this patent
UNITED STATES PATENTS

| | | |
|---|---|---|
| 1,409,748 | Meiselbach | Mar. 14, 1922 |
| 2,238,127 | Nissen | Apr. 5, 1941 |
| 2,287,641 | Russell | June 23, 1942 |
| 2,465,565 | Agner | Mar. 29, 1949 |
| 2,522,255 | Clino | Sept. 12, 1950 |
| 2,551,996 | Cherubini | May 8, 1951 |
| 2,581,671 | Katter | Jan. 8, 1952 |
| 2,728,543 | Grevich | Dec. 27, 1955 |

UNITED STATES PATENT OFFICE

CERTIFICATE OF CORRECTION

Patent No. 2,893,667                                                     July 7, 1959

Samuel O. Shumaker

It is hereby certified that error appears in the printed specification of the above numbered patent requiring correction and that the said Letters Patent should read as corrected below.

Column 6, line 12, for "position" read -- portion --; column 8, line 10, after "member" insert a comma.

Signed and sealed this 16th day of February 1960.

(SEAL)
Attest:

KARL H. AXLINE
Attesting Officer

ROBERT C. WATSON
Commissioner of Patents